March 23, 1965 H. B. BROSE 3,174,525
TIRE REPAIR INSERT
Filed Nov. 21, 1963 2 Sheets-Sheet 1
FIG. 1.
FIG. 4.
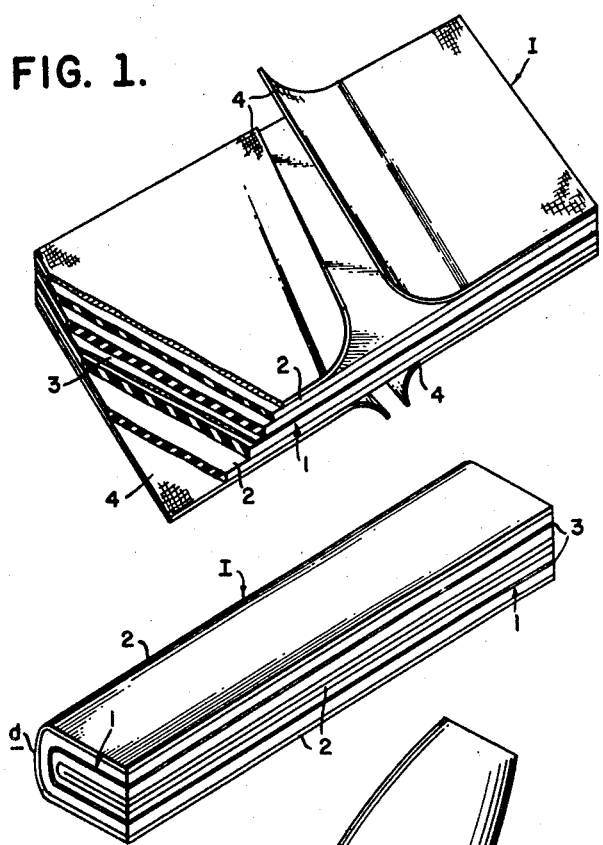
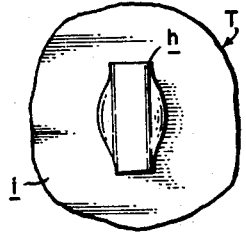
FIG. 5.
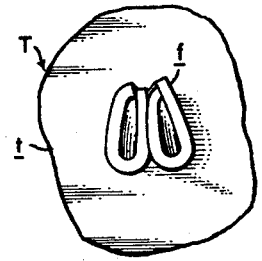
FIG. 2.
FIG. 6.
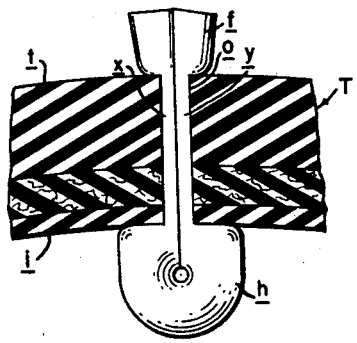
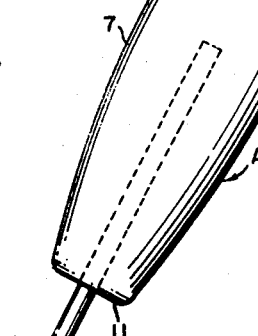
FIG. 3.
INVENTOR
HORACE B. BROSE
BY 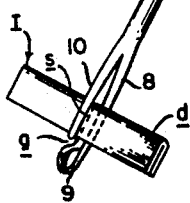
ATTORNEY March 23, 1965
H. B. BROSE
3,174,525
TIRE REPAIR INSERT
Filed Nov. 21, 1963
2 Sheets-Sheet 2
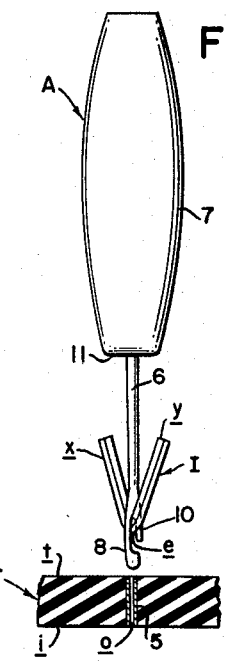
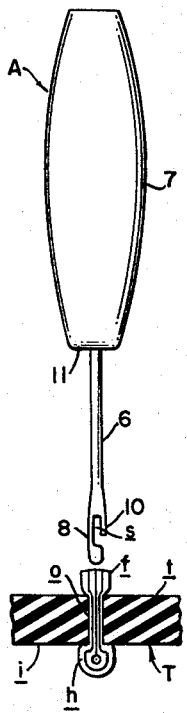
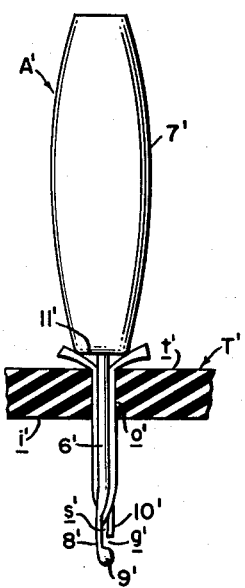
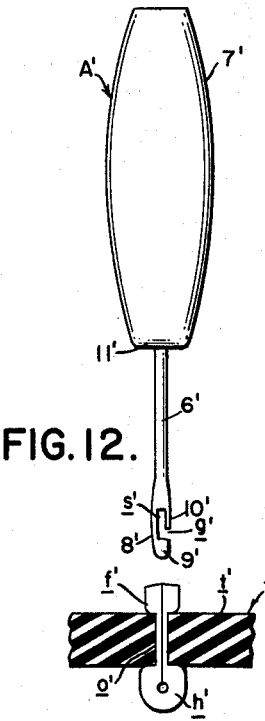
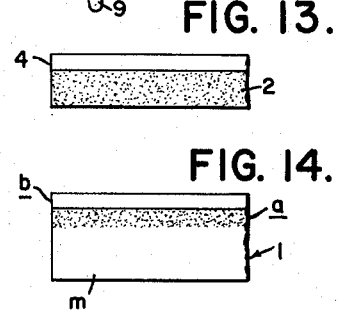
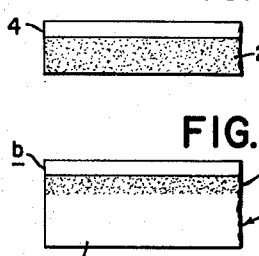
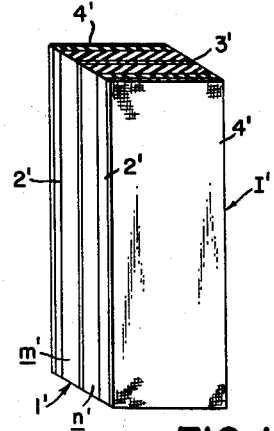
INVENTOR
HORACE B. BROSE
BY
ATTORNEY

3,174,525
TIRE REPAIR INSERT
Horace B. Brose, 5013 N. Westshore Blvd., Tampa, Fla.
Filed Nov. 21, 1963, Ser. No. 325,274
14 Claims. (Cl. 152—370)

This invention relates to a sealing insert applicable to a puncture opening in a vehicle tire, particularly of the inflatable tubeless type. More especially it is concerned with the sealing of such an opening by the use of a highly elastic, multi-ply, composite insert of wafer or strip form, with certain of the steps involved in its production, and with the means employed to effect its placement in optimum sealing position within the opening while in a state of extreme compression whereby to generate a corresponding reactive force producing an outward pressure against the tire walls surrounding the opening. Much of this invention has been previously disclosed in my Tire Repair Insert application filed January 22, 1962, Serial No. 167,724, and now abandoned, of which this case is a continuation-in-part.

A tire repair insert, to be effective, must combine the desirable properties of elasticity, pliability, tensile strength, and conformability to various tire injury openings differing widely in size and shape. At the same time it involves problems in the union of its components if of multi-ply structure, in application of the insert to optimum sealing position within a tire injury opening, in securing the insert immovably therein, and in sealing the insert to the walls surrounding the injury opening.

These problems, also others which will hereinafter be noted, have been overcome by the present insert, by the means and method employed in its production, by its application to a tire injury opening through means which assures its placement in optimum sealing position, and by means which interlocks the insert with the tire, both mechanically and chemically, in such a way as to retain it immovably for an indefinite period. These objects and advantages are realized by means which also conduces to a reduction in (1) cost of its production, (2) in the time required for its installation, and (3) in the dependability of its correct positioning for optimum results.

Certain preferred embodiments of this invention are illustrated in the accompanying drawings in the manner following:

FIGURE 1 is a perspective view, partly in section, of the present insert in its initial form of an elongated wafer, its protective covers being shown as partly freed for removal; FIG. 2 shows in perspective the wafer form of insert as it appears when first folded longitudinally of itself; FIG. 3 is a perspective view of the folded insert operatively fitted to one form of applicator preparatory to its installation within a tire injury opening; FIG. 4 is a fragmentary elevational view of a portion of the injured tire, looking toward its inner face and the proximate end portion of the insert which remains protruded therefrom in the form of a greatly expanded head after its installation in an injury opening; FIG. 5 which is a view similar to FIG. 4 shows the tread face of the tire and the end portions of the two limbs of the insert protruded outwardly and distended into a head of irregular form; FIG. 6 is a fragmentary detail in section through a tire transversely of its axis, showing the insert in elevation as it appears when in operative position within the injury opening following withdrawal of the applicator therefrom; FIG. 7 which is a sectional detail of a tire, similar to FIG. 6, shows an applicator with folded insert carried thereby, as it appears when positioned oppositely of an injury opening in a first stage of its installation operation; FIG. 8 is a similar view showing the applicator advanced to its limit to carry the insert through its second stage of the installation operation; FIG. 9 which is also a similar view shows the applicator withdrawn from the tire injury opening and disengaged from the insert which remains therein in its operative sealing position; FIG. 10 is a sectional perspective view of the insert modified from a wafer-type into one having the general form of an elongated strip or bar with a rectangular cross section; FIG. 11 which is a view similar to FIG. 8, shows the insert of FIG. 10 advanced to its limit within a tire injury opening, the applicator being then ready for disengagement therefrom and withdrawal from the tire injury opening; FIG. 12 which is a view similar to FIG. 11 shows the insert as it appears in its operative sealing position within the injury opening following withdrawal therefrom of the applicator; FIG. 13 is a greatly enlarged fragmentary elevational view of one edge of a facing component of the insert, as it appears prior to assembly with a component of the base lamination, but with a temporary cover applied to one face thereof; FIG. 14 is a similar view of one component of the base lamination to one face of which is applied a covering preparatory to an external heat treatment preliminary to its assembly with the facing lamination of FIG. 13; and FIG. 15 which is a similar view, shows a pair of facings each assembled with a base component, the latter being arranged back to back oppositely of each other with an intervening spread of adhesive uniting them permanently together.

The term "tire," as used herein, has reference to the usual casing of an inflatable tire for which the present sealing insert is especially adapted. With a tire having an inner tube, this term would designate the outer casing therefor, and it should be so understood herein. The field of use of the insert of this invention is that now dominated by the so-called tubeless tires, hence the description will be confined thereto in the detailed disclosure to follow.

The tire sealing insert I desirably consists essentially of a multi-ply wafer having a lamination 1 of rubber or the like forming a resilient base which is arranged between a pair of uncured vulcanizable facing laminations 2. The base lamination is specially formed in that its body is vulcanized throughout, all except for certain skin portions $a$ adjacent its outer faces to which the uncured facing laminations 2 are applied. The areas which are stippled (shown only in FIGS. 13–15) denote uncured rubber in the facing laminations 2 and also in the skin portions of the intervening base components which remain uncured as distinguished from the major portion of the latter's body which is vulcanized.

It will be found convenient and economical to produce the base lamination from separate layers $m$ and $n$, originally in the form of sheets, of a suitable rubber composition (FIGS. 14 and 15), each having applied to one face thereof a thin heat-resistant covering $b$ of some such material as holland cloth, preliminary to any curing operation (FIG. 14). A light spread of powdered talc or the like is desirably applied to the opposite face of each sheet for its protection during a subsequent heat treatment, as in an oven, whereby to produce vulcanization thereof. Because of the presence of the applied heat-resistant covering $b$ to one face of each sheet so treated, the ensuing vulcanization will stop short of that face, with the result that substantially no skin-curing thereof will take place. Following this operation, the coverings $b$ are stripped from the treated sheets $m$ and $n$ to expose their untreated faces which retain their soft and tacky properties. To their uncured faces, the facing laminations 2 of uncured rubber may then be applied where they remain united by pressure contact alone. This is a simplified and inexpensive way of completing the assembly of these laminations. After removal of the powdered talc from the opposite face of each sheet $m$ and $n$, two of them are then arranged back to back with an intervening spread 3 of adhesive, such as a rubber-based cement, to unite them permanently together. Thin covers 4 of holland cloth or the like, previously applied removably to the exposed tacky faces of the facing laminations 2, remain in place to protect them up to the time of use. As a final step, the sheets so produced and assembled are severed along multiple parallel lines crossing each other to provide small multi-ply pieces desirably in the form of wafers which serve effectively as tire-sealing inserts when used as hereinafter described.

In a commercial embodiment of the invention, one convenient size for each of these laminated inserts is 1" x ½". Other sizes differing in their dimensions may also be required for use with all the usual variety of tire injury openings which, while varying somewhat in size and shape, are commonly formed as small slits or splits in the tire casing wall. While additional laminations may be used, the arrangement and number just described is highly satisfactory. For example, the base lamination 1 may be produced in various thicknesses by uniting two, three or more layers into a single unit. One desirable thickness for the wafer, minus protecting covers, is about .086", in which case the base lamination thickness is desirably about .056", that of each facing lamination 2 of uncured rubber being about .014". The volumetric ratio of the two components comprised in such an insert would then be about 2 to 1—a desirable proportion for an effective tire injury seal. The cured rubber base should possess sufficient tensile strength, when in the form of multiple components as herein described, to withstand the usual disrupting forces encountered during a forcible tractive advance of the insert body, while in a stretched and attenuated state, into and through a tire injury opening. A high degree of elasticity is also desirable in order that the insert body may readily yield during its movement into the injury opening, but with capacity for exertion of a firm outward pressure against the surrounding walls thereof. The laminations of uncured rubber forming the facings of the insert are soft and pliable so as to be readily conformable to the contour of the injury opening. They may also be conditioned for self-vulcanizing by incorporating therein a self-sufficient accelerator, such as oleic acid (about 2% by weight) and sulfur (about 3% by weight), the latter being helpful but not essential.

In practice, the insert I is optionally folded upon itself along the line $d$ extending longitudinally and centrally thereof (FIG. 3). At this stage the insert is then U-shaped in cross section. Its thickness is also doubled and its width is halved, this change in its cross sectional dimensions then adapting it better for sealing reception in injury openings having a somewhat similar size and shape. To install, it is advantageous to employ a suitable applicator A which clampingly engages opposite faces of the insert along a central transverse line $e$ whereat the insert is also foldable upon itself to provide a leading end therefor when advanced into a tire injury opening $o$ (FIG. 7). The applicator is then manipulated to transmit a tractive force to the insert along the line $e$ to produce thereat a transverse fold in its body with limb portions $x$ and $y$ trailing therefrom side by side. The tractive force so applied is then effective to advance the insert into one end of the tire injury opening. This operation is usually performed at the tread face $t$ of the tire while still mounted on its rim. In its operative sealing position, opposite end portions of the insert body remain protruded to form enlarged heads, one, designated as $f$, adjacent the tire tread consisting of two disconnected limb end portions which are distended laterally and irregularly away from each other, and the other, designated as $h$, adjacent the tire inner face $i$ providing between the two limbs, in the area of the transverse fold $e$ therebetween, an unbroken connection which is greatly expanded into the general form of an eyeroll, as further described hereinafter. The two heads $f$ and $h$ thus formed overlie the proximate faces of the tire in engaging relation therewith, and cooperate to hold the insert against longitudinal movement, either way, within the injury opening $o$. At this stage the applicator is ready to be disengaged from the insert and withdrawn from the opening for repeated use elsewhere. The protruding end portions of the insert at its opposite ends may be left untrimmed, the two limbs at the tread face of the tire then wearing off smoothly after a few miles of road travel.

It is desirable that the injury opening $o$ to be repaired be first cleaned out and smoothed off. For this purpose, a small buffing tool will be useful. In this cleaning operation it is important also that the body surfaces freshly exposed by the newly-created opening be scraped clean so that free sulfur residue embedded within the tire may receive contact from a spread 5 of rubber-based cement which is then promptly introduced into the opening and carefully distributed therein (FIG. 7). This cement which is self-vulcanizing serves initially as a lubricant to facilitate movement of the insert into and through the injury opening, and thereafter as an adhesive to secure the insert therewithin. The composition of this cement may be the same as that used in the adhesive spread 3. It should include an accelerator which acts also as a vulcanizing agent when in contact with the residue of free sulfur exposed by the freshly-created opening in the tire body.

An applicator A that is suitable for installation of the present insert is illustrated in FIG. 3. It consists of a needle having a shank 6 with a substantially round cross section one end portion of which is fixedly accommodated within an elongated handle 7, axially thereof, for convenient operation thereby. In its opposite end portion the needle is formed with a slender head 8 that is slightly narrowed in one direction and widened transversely thereof, then gently tapered and rounded toward its extremity to provide a blunt probing nose 9. A slot $s$ extended longitudinally within the widened portion of the head is defined, in part, by a finger 10 beyond which is a gap $g$ affording a lateral opening into the slot at one end thereof. The closed end of this slot lies a predetermined distance from the proximate end 11 of the handle, this end of the handle being adapted, upon completion of the needle advance within the injury opening, to engage the insert head $f$ then forming at the tread face $t$ of the tire (FIG. 8). This end of the handle, when so engaged, then serves as a gauge to limit the forward movement of the insert into and through the tire injury opening $o$, thereby apprising the workman that the insert has been advanced through the predetermined distance requisite for its optimum sealing position.

The needle head 8, which increases the overall width of the shank 6 but very little, provides in effect a C-hook whose finger 10 is adapted to clamp the insert body, folded or otherwise, when the latter, stripped of its covers, is fitted into the slot $s$ preparatory to its introduction into a tire injury opening. When the insert has been applied to such an applicator, a first step is to dip the insert into a liquid rubber-based cement or solvent to acquire thereon a coating 5 for effective cooperation with the cement spread already placed around and within the injury opening $o$. The applicator is then ready for manipulation to advance its probing nose 9 into and through the injury opening as far as permitted by the handle-gauge above described.

In the ensuing placement operation the two end portions $x$ and $y$ of the insert will trail behind its leading end portion at the transverse fold line $e$. These trailing end portions constitute limbs which lie along opposite sides of the applicator needle whose position remains more or less centrally of the injury opening in spaced relation to the surrounding walls thereof. The insert body, if twice-folded, is also U-shaped in cross section with its two limbs integrally connected at the transverse fold line $e$. During this stage of the operation, the applicator is advanced axially, and also optionally rotatively through a compound motion, to apply a tractive force to the insert to propel it through a path, spiral or other wise, into and through the tire injury opening $o$. This forward movement is accompanied (1) by a stretching and attenuation of the two insert limbs x and y, and, optionally, (2) by a wrapping of the limbs spirally about the applicator needle as the insert is tractively advanced into and through the injury opening.

This complete change in form and size of the insert is possible largely because of the extreme pliability and elasticity inherent in the composite insert body when doubled or redoubled upon itself to multiply the number of its laminations. The limbs x and y are then enabled to conform to the exact contour and size of the injury opening o in which the insert is lodged, while in a highly attenuated state and exerting a strong outward pressure against the surrounding walls of the opening. Advance of the insert continues until stopped by engagement of the handle end 11 with the insert head f then forming upon the tread face t of the tire (FIG. 8). At that point the handle end pressing against the head f will promote a lateral spread thereof, thereby preventing any further movement of its body into the injury opening. At that point also the leading end of the insert has emerged a considerable distance beyond the inner end of the opening o to lie in open space adjacent the tire inner face i. Here the folded leading end of the insert, when disengaged from the applicator and free to relax, tends to expand out laterally into a head several times the size of its body which still remains confined within the opening. The insert body remains intact and unbroken when and after the applicator has been disengaged therefrom. It is then free for lengthwise contraction both within the injury opening and inwardly therebeyond. It is at this point that the insert folded end portion lying adjacent the tire inner face i will become expanded to produce the head h (FIG. 9), taking the general form of an amorphous eye-roll which pressure-engages therewith to effectively resist any tendency toward outward retractive movement on the part of the insert in response to restored air pressure within the tire. The distended free end portions of the limbs x and y which remain exteriorly of the tire beyond its tread face t also provide the head f which engages therewith.

When in optimum sealing position, the insert eye-roll curvature is extended peripherally through the major portion of a circle, with only a relatively small axial opening therethrough, and in flatwise engagement with the tire inner face i over a substantial area surrounding the proximate end of the injury opening o (FIG. 6). No difficulty will be encountered in arriving at approximately this exact position if an applicator as herein described be used. Account should be taken of some of the interacting forces which are created during the operation of installation. First of all, those portions of the two limbs x and y which are confined within the injury opening, are compressed and attenuated to a high degree; in consequence, the yieldable material forming the composite insert body is displaced elsewhere and in the only direction open to it, viz., lengthwise and inwardly beyond the inner face i of the tire to enter into open space. The insert body material outwardly of the tire tread face t will no longer be drawn toward the injury opening and forcibly compressed for entry therein; instead, those portions of the limbs x and y, still disconnected and free for independent distention to form the head f, are relied upon to oppose any complete lengthwise movement of the insert into the injury opening.

A very different condition prevails beyond the tire inner face i where the two limbs x and y continue to remain integrally joined. These limbs are advanced and concurrently stretched by the applicator through a predetermined distance which carries a substantial portion of their length through the injury opening and therebeyond into open space within the tire. When advanced to their final position, the limbs are greatly stretched beyond their original length throughout their forward portions and those portions thereof still remaining within the injury opening. The extent of this stretching is approximately twice their original length. Upon removal of the applicator, a contraction of these stretched portions of the limbs immediately follows, plus a lateral release of their forward unconfined portions. The limb portions within the injury opening o are prevented from expanding laterally, but they are free to contract longitudinally. In so doing, they exert a strong pulling force which tends to quickly draw the folded forward end of the insert back toward the opening o. Concurrently, this unconfined forward end portion of the insert laterally expands, forming itself into an eye-roll head h which engages the inner tire face i. An effective resistance to any such retractive movement of the insert is thereby imposed by the then-created head h which spreads out against the inner face i of the tire, thereby to establish a permanent barrier against any further outward movement of the insert relative thereto.

The head h thus formed is regularly characterized by these physical features: (1) the eye-ball diameter builds up to at least three times that of the injury opening wherein the insert body remains confined; (2) the cross-sectional diameter of each insert limb becomes substantially equal to the radius of the roll; (3) the axis of the roll is disposed transversely of the injury opening; (4) the peripheral curvature of the roll extends through 270 degrees or more; (5) the roll is also substantially elongated in an axial direction; (6) a substantial area of the roll periphery is deformed to engage flatwise with the inner face i of the tire in the area immediately surrounding the proximate end of the injury opening; (7) the roll head throughout is tensioned by (a) an enhanced stretching of the outer radial portion of its body, and (b) an enhanced compression of its inner radial portion, thereby firming up the entire head h; and (8) the eye-roll head is maintained in tight resilient engagement with the tire inner face i to provide an effective seal thereat. The head thus formed is considerably larger, firmer, and more effective than is the head f at the tire tread face t.

The factors responsible for production of the eye-roll head h are so variable as to preclude any real uniformity in their size, shape and appearance. There is but one constant factor in most cases, that being the original size of the insert itself. The length of the injury opening o into which the inserts are to be fitted may vary, depending upon the wall thickness of the tire itself at that point. Also the cross-sectional area of the opening may vary widely, whereby to impose an uncertain frictional resistance to advance of the inserts therethrough. For these reasons alone, any applicator serving both to advance an insert into and through an injury opening and also to limit the extent of its advance therein, cannot assure a uniform amount of stretching thereof nor an exact uniform positioning of its forward folded end within the open space beyond the inner face of a tire. Nevertheless, an applicator, when operated as herein described, will regularly serve to advance the present insert to substantially its optimum sealing position. It is expected that an intelligent workman will select from his supply of inserts the one whose size is best suited for effective installation in an injury opening to be repaired. Experience has shown that even though there be considerable variations in size and shape of the eye-roll head, they all remain fully effective to secure the insert firmly in place within an injury opening. If the insert be so stretched that its folded inner end is protracted beyond the inner end of an injury opening a further distance than necessary, the result will simply be an eye-roll head of increased diameter with an enlarged axial opening therethrough; if not so stretched, the diameter of the roll head and its axial opening will be somewhat less. Variations such as these are relatively inconsequential insofar as concerns the capacity of the insert to provide an effective seal for a tire injury opening.

There is little or no deviation in the physical characteristics of the inserts in the points above noted. Each is relatively solid throughout, its resistance to compression is enhanced, and its size, both axially and diametrically, exceeds by many times the cross-sectional dimensions of the injury opening $o$ wherein the insert limbs $x$ and $y$ remain in a state of compression. As a means of locking the insert securely against outward retractive movement from the injury opening, this feature of my invention marks an impressive improvement over previous tire repairs.

It is impossible to depict the size, shape, rugae or contour of either insert head $f$ or $h$ with exactness because they are wholly amorphous in character. No two of them are entirely alike. This may be due, in part at least, to the great disparities in the forces, created during the installation operation, which are responsible for concurrent compression, stretching, attenuation, and expansion in various portions of the same insert. Variations in the sizes and shapes of the injury openings, as well as the resistance offered by the surrounding walls thereof, control to a considerable extent the conformed size and shape of the installed inserts. Also the degree of tensity in the several forces created within these inserts at the time of their installation is a factor precluding any uniformity in their size, shape and appearance. The showings of the heads $f$ and $h$ throughout the drawings suffice to indicate roughly their general conformation, but should not be taken as exact representations thereof.

During the major portion of its advance through an injury opening $o$ and out into open space therebeyond, the insert I, because of its elasticity, is amenable to stretching of its limbs $x$ and $y$ and related attenuation thereof while elongated within the injury opening. A powerful reactive counter pressure is then exerted outwardly against the tire walls surrounding the opening, causing the insert limbs to expand laterally with increased force into every crack and crevice in the injury opening that is exposed for their reception. This counter pressure is also reflected in the degree of expansion of the unconfined portions of the insert limbs which lie exteriorly of the opening to form the heads $f$ and $h$ at opposite ends thereof. In practice, these heads which are somewhat irregular in contour are wider by at least three or four times than is the intermediate body of the insert which remains compressed within the injury opening to exert a continuing strong outward pressure against the surrounding walls thereof. Even though some minor diminution in this pressure will follow disengagement of the applicator from the insert and its withdrawal from the then-repaired injury opening, an effective sealing thereof which takes place very rapidly will have been completed after a short period of time.

The description up to this point has dealt primarily with the mechanical interlock between the insert when fitted into the injury opening resulting from (1) the cotter-pin form of the former providing spaced heads engaging opposite faces of the latter, and (2) the adhesive connection therebetween provided by the intervening spread of 5 of cement. Because the material of which the insert is made is elastic, pliable and displaceable, any such yieldable interlock alone may prove adequate, particularly if application of the cement spread be defective or imperfect. The contour of the tire, even when properly inflated, tends to deflect somewhat in response to its travel over the road. A pop-out or loosening of the insert in such circumstances is always a possibility. To obviate any such risk, I provide means whereby to establish additionally a chemical bond between the insert and tire through a heat-free and non-delayed vulcanization of one with the other. This is accomplished by incorporating in the composition of the rubber-based cement applied to the insert exterior of uncured vulcanizable rubber, and to the exposed surfaces of the injury opening in the cured rubber casing of the tire, an accelerator which is capable also of fast action as a vulcanizing agent. Such an accelerator is ethyl phenyl- dithiocarbamate which reacts with (1) the oleic acid (and sulfur, if used) in the facing laminations 2 of uncured vulcanizable rubber, and with (2) the small amount of free sulfur still remaining in the tire. The content of such an accelerator in the cement spread should be adequate to give it potency sufficient to react promptly and effectively with the free sulfur remaining as residue in the tire. For example, to a cement composition which includes salicyclic acid, zinc dibutyldithiocarbamate and other ingredients, totaling 200 lbs., about 50 lbs. of zinc ethyl phenyldithiocarbomate should be added to serve effectively as the vulcanizing agent herein. In practice, vulcanization is initiated upon application of the cement spread 5 containing this accelerator-vulcanizing agent to both the uncured rubber facings of an insert and to the tire casing within the injury opening therein, and continues upon installation of the insert within said opening, to pressure-engage intimately therewith, thereby to chemically bond one permanently to the other. The time required for such bonding action to become effective, temporarily at least, is but a few minutes, so that completion of the tire repair operation need not hold up operation of the vehicle for any appreciable time.

In FIG. 10 I have illustrated the present multi-ply insert when produced in strip or bar form, using the same system of reference characters for designating like parts as heretofore described in connection with the remaining figures, except for the addition of a prime (') in each case. This insert I' comprises two united layers of rubber forming a base lamination 1' which is cured throughout except for its opposite skin areas which remain uncured to be covered over by uncured rubber facing laminations 2' to which temporary outside covers 4' may be applied. Because an insert of this form is relatively thicker in one dimension and thinner in another, as compared with a wafer-type of insert, it is better adapted for installation in certain tire injury openings having a somewhat similar cross-sectional contour and size. When fitted into the applicator A' for engagement thereby at a point close to one end thereof, it is then dipped into a bath of rubber-based cement as hereinbefore described to be enveloped by a coating thereof. In this condition, it is finally folded upon itself when advanced by the applicator into an injury opening previously cleaned and lubricated with a similar rubber cement composition. The applicator is disengaged from the insert when the latter has been advanced to its operative sealing position (FIG. 12), the applicator being then withdrawn from the opening. Opposite end portions of the insert so positioned are protruded beyond the tire tread face $i'$ and inner face $i'$ thereof where they are free to expand and do so to forms heads $f'$ and $h'$ which engages these faces of the tire, thereby to establish therewith an interlock which tends to hold the insert fixedly in place while stretched and attenuated. Its securement within the opening and sealing thereof is further enhanced by the chemical bond established promptly thereafter by the process of vulcanization already described. Such a one-limb insert is particularly suitable for use by itself in a relatively small opening, if of small dimensions, or in a larger opening if of larger dimensions, or it may be used along with a wafer-type of insert where the size of the opening can best be filled by two or more such inserts, disposed side by side.

The facing 2 cover opposite faces of the base lamination 1, but not its sides. As a result, the uncured skins of its layers $m$ and $n$, also the cement spread 3, remain exposed around all four sides of the insert. When introduced into an injury opening, the cement spread 5 therein is free to contact with these sides of the insert to induce vulcanization thereof at lineal points beyond and removed from the facings 2 where vulcanization is also initiated. In consequence, (1) the process of vulcanization is expedited because of having been started concurrently along several fronts, and (2) the laminated base of the insert is itself permitted to unite chemically directly with the tire walls surrounding the injury opening. While during this process the facings are also chemically bonded with the tire, they do not extend continuously over every portion of the insert base lamination which, in consequence, is free to spot-bond itself directly to the tire, thus enhancing the value of its securement within the injury opening.

When installed within an injury opening, the present insert is folded, perhaps twice-folded, and in this condition remains fixedly secured therein. Even quadrupling of its laminations does not suffice to make the insert unduly bulky. Any gain in its cross-sectional dimensions, when relaxed, is matched by an increased capacity for attenuation, when stretched. During installation, the walls surrounding an injury opening must be forced apart somewhat, but not nearly so much so as would be required with an insert of corresponding size if devoid of multiple laminations as herein disclosed. It follows that only a minor strain is imposed upon the body of a tire when its injury opening is enlarged the slight amount necessary for accommodation of the present insert and the applicator therefor, and during this operation any further splitting of the tire walls or damage to the nearby cords therein can be obviated or held to a minimum. Because of its unique properties and structure, my improved insert is also adaptable for effective use in many time injury openings varying widely in size and shape, thereby permitting its use in many diverse situations with only a minimum number of different sizes and shapes of inserts necessary for such purpose. In fact, in cases of unusually large puncture openings to be repaired, it is possible to provide an effective seal by installing therein more than one insert, either concurrently or sequentially.

One further point of merit to be noted is the presence, in the facing laminations of uncured rubber, of a small amount of accelerator, and the absence, complete or nearly so, of any such vulcanizing agent as sulfur. This tends to assure a prolonged shelf-life for the inserts when produced as herein described. Self-vulcanization of these facings takes place only when the inserts are highly compressed within the injury opening of a tire containing some residue of free sulfur, and then only when enveloped by a spread of rubber cement, containing an accelerator of the requisite potency and amount, which is in pressure-contact with the exposed tire walls surrounding the injury opening. In such circumstances self-vulcanization of the facings 2 and of the immediately-adjacent uncured skins of the base laminations 1 will be initiated and advanced to produce a chemical union therebetween and between the insert facings and the tire body walls which define the injury opening. This chemical reaction will start and proceed promptly, without thermal assistance, enabling the tire so repaired to be inflated to its normal pressure preliminary to its travel over the road, all within a few minutes of time. The vulcanization process so initiated may possibly continue on for some hours, but this fact is unimportant to safety since from and after these first few minutes the insert is fixedly locked in its sealing position by the large eye-roll head $h$ at its inner end which engages firmly with the inner face of the tire continuously around the proximate end of the injury opening.

I claim:

1. The method of forming an eye-roll head at one end of a one-piece elastic tire repair insert during its installation between the constricted walls of a lubricated injury opening extending through the body of a tire between inner and outer faces thereof, which comprises the steps of (1) folding the insert medially upon itself to provide a pair of side by side limbs being joined by an integral continuous intermediate portion, (2) applying a tractive force inwardly of the insert fold to advance the insert with the said folded intermediate integral continuous portion first, into the injury opening, starting from its end at the outer face of the tire and continuing therethrough and beyond the inner face thereof against frictional resistance imposed by the constricted walls of the opening, and (3) discontinuing application of the tractive force when the insert has been advanced to a predetermined point where the frictional resistance imposed upon its limb portions has produced a desired lengthwise displacement thereof and leaving said integral continuous intermediate portion joined to said limb portions, those portions of the limbs within the injury opening and therebeyond then becoming attenuated and elongated substantially beyond their original length, thereby to relax the insert and permit the unconfined integral continuous intermediate portion joining the limbs to expand reactively into the form of an eye-roll head, concurrently with a lengthwise contraction of its attenuated limbs within the opening tending to draw the newly-formed head into tight engagement with the tire inner face.

2. The method of forming an eye-roll head at one end of an elastic tire repair insert, according to claim 1, wherein elongation of the limb portions within the injury opening and therebeyond is continued through a distance approximately twice their original length.

3. The method of producing a multi-ply tire repair insert comprising a base lamination and a facing therefor, both of uncured vulcanizable rubber with opposite tacky faces, the latter containing an accelerator, which comprises the steps of (1) applying to one tacky face of the base lamination a heat-resistant covering therefor to remain removably attached thereto through a preliminary period only, (2) subjecting the base lamination, while so covered, to a heat treatment sufficient to produce a variable vulcanization thereof, extending diminishingly from its uncovered face inwardly through the lamination body toward its opposite face, but substantially ending short thereof, (3) removing the heat-resistant covering from the non-vulcanized tacky face of the base lamination, (4) applying a facing lamination to the non-vulcanized tacky face of the base lamination for adherence thereto consequent upon pressure contact therewith, and (5) enveloping the assembled insert within a cement spread containing an accelerator to induce vulcanizing of the facing lamination and of the base lamination non-vulcanized face in engagement therewith, thereby to bond the one chemically to the other.

4. A multi-ply tire repair unit comprising a base lamination of rubber variably vulcanized throughout its body, starting at one face thereof and substantially ending short of its opposite tacky face, and a facing lamination of uncured vulcanizable rubber applied to the tacky face of the base lamination and united thereto by vulcanization therewith.

5. A wafer-type of tire repair unit comprising a pair of base lamination layers each of rubber variably vulcanized throughout its body, starting at one face thereof and substantially ending short of its opposite tacky face, an adhesive spread extending between two such layers when arranged with their cured faces in mutual contact whereby to unite them permanently into a unitary base lamination, and a facing lamination of uncured vulcanizable rubber applied to the outer tacky face of each base lamination layer and united thereto by vulcanization therewith.

6. A tire of cured rubber composition wherein is a small residue of free sulfur, there being extended between inner and outer faces of the tire an elongated injury opening exposing the tire body interiorly thereof, an elongated sealing insert of highly elastic and compressible material provided with an exterior facing of uncured vulcanizable rubber containing a self-sufficient accelerator, the insert being receivable within the injury opening only when stretched and attenuated to exert therein, through its exterior facing, a strong reactive pressure directed outwardly against the exposed inner surfaces of the tire body, said insert including a one-piece construction having a pair of limb portions joined by an integral continuous intermediate portion disposed in engagement with the inner surface of the tire and being in the form of an eye-roll head, and a cement spread interposed between the insert and interior surfaces of the injury opening to engage intimately and continuously with the exterior surfaces of the one and the interior surfaces of the other, the cement spread containing an accelerator in an amount and potency sufficient to react (1) with the accelerator in the facing and (2) with the relatively small amount of free sulfur present as residue in the cured rubber tire whereby to vulcanize the facing and produce a chemical bond between the latter and the exposed tire wall body consequent upon the intimate pressure contact established therebetween.

7. A cured rubber tire having an injury opening wherein an elongated insert is tightly fitted, according to claim 6, the insert body being produced from a rubber composition cured throughout except for its outer skin, and the facing being initially united thereto by pressure contact therewith, the reaction induced by the accelerator in the cement spread acting also to chemically bond the facing to the uncured outer skin of the insert body.

8. A cured rubber tire having an injury opening wherein an elongated insert is tightly fitted, according to claim 6, the facing being discontinuous to expose limited areas of uncured outer skin of the insert body, and the reaction induced by the accelerator in the cement spread acting also to chemically spot-bond the insert body directly to the tire wall body.

9. A composite sealing insert for a cured rubber tire, according to claim 6, wherein the facing accelerator comprises oleic acid in an amount of approximately 2% by weight.

10. A composite sealing insert for a cured rubber tire, according to claim 6, wherein the facing accelerator comprises oleic acid and sulfur, each in an amount not exceeding 3% by weight.

11. For application to a tire of rubber composition wherein is an elongated injury opening extending through its body between inner and outer faces thereof, an elongated one-piece sealing insert of highly elastic rubber composition doubled medially upon itself to provide a transverse fold interconnecting two side by side limbs extending through the tire injury opening in a stretched and attenuated state, the joined end portions of the limbs being protruded beyond the tire inner face for lateral expansion in open space thereat whereby to form an enlarged integral and continuous head joined with said limbs and being in the general form of a roll having an elongated axis disposed transversely of the injury opening, the inner and outer radial portions of the head roll being respectively compressed and stretched to tension the head into a state of increased firmness, and a portion of the outer surface of the head overlying the inner face of the tire to engage therewith over an extended area immediately adjacent the injury opening to block the insert from longitudinal movement through the injury opening toward the outer end thereof.

12. A tire sealing insert according to claim 11 wherein the head roll curvature extends through a minimum of 270 degrees.

13. A tire sealing insert according to claim 11 wherein the limbs are protruded also beyond the tire outer face where they are separable for lateral distention to form a head overlying and engaging the adjacent area of the proximate tire face whereby to limit longitudinal movement of the insert through the opening toward the inner end thereof.

14. The method of repairing an injury opening in the body of a tire comprising the steps of providing a laminated elastic tire repair insert, providing a tool having an elongated shank adapted to fit through the injury opening and being connected with a handle portion of substantially greater cross sectional dimension, engaging the insert with a part of said shank, folding the insert medially upon itself to provide a pair of side-by-side limbs joined by an integral continuous intermediate portion, moving said tool inwardly from the outer face of the tire toward the inner face thereof so as to insert said shank within said injury opening and to move the insert inwardly through said injury opening with the intermediate integral continuous portion of the insert first, continuing to move the tool inwardly until the end of the enlarged handle portion of the tool engages the outwardly projecting ends of the insert and until inward movement is limited by such engagement whereupon the insert has been advanced through a predetermined distance requisite for its optimum sealing position, then moving the shank of the tool backwardly through the injury opening in a direction opposite to that in which it was inserted while leaving the integral continuous intermediate portion of the insert joined to the limb portions thereof and causing the unconfined integral continuous intermediate portion joining the limb portions to expand reactively into the form of an eye-roll head in engagement with the inner surface of the tire.

References Cited by the Examiner
UNITED STATES PATENTS

| | | | |
|---|---|---|---|
| 1,503,701 | 8/24 | Morton et al. | 152—367 X |
| 3,035,625 | 5/62 | Mullen | 152—320 |
| 3,095,342 | 6/63 | Kraly | 152—370 |

ARTHUR L. LA POINT, *Primary Examiner.*